United States Patent
Marra et al.

(10) Patent No.: US 10,011,101 B2
(45) Date of Patent: Jul. 3, 2018

(54) BIOMASS ARTICLE AND METHOD OF MANUFACTURING

(71) Applicant: SATIN GREEN TECHNOLOGIES, LLC, Brooklyn, NY (US)

(72) Inventors: Angelo Marra, Brooklyn, NY (US); Alfredo Mellace, Brooklyn, NY (US); Joseph Addeo, Brooklyn, NY (US)

(73) Assignee: SATIN GREEN TECHNOLOGIES LLC, Brooklyn, NY (US)

( * ) Notice: Subject to any disclaimer, the term of this patent is extended or adjusted under 35 U.S.C. 154(b) by 0 days.

(21) Appl. No.: 14/589,109

(22) Filed: Jan. 5, 2015

(65) Prior Publication Data

US 2015/0114542 A1 Apr. 30, 2015

Related U.S. Application Data

(62) Division of application No. 13/042,023, filed on Mar. 7, 2011, now Pat. No. 8,927,105.

(51) Int. Cl.
*B32B 37/15* (2006.01)
*B32B 37/06* (2006.01)
(Continued)

(52) U.S. Cl.
CPC ............... *B32B 37/15* (2013.01); *B32B 7/12* (2013.01); *B32B 9/04* (2013.01); *B32B 23/04* (2013.01);
(Continued)

(58) Field of Classification Search
CPC . B32B 2307/7163; B32B 23/04; B32B 23/08; B32B 27/06; B32B 27/308;
(Continued)

(56) References Cited

U.S. PATENT DOCUMENTS 2,029,034 A 1/1936 Pollock
2,757,150 A 7/1956 Heritage
(Continued)

FOREIGN PATENT DOCUMENTS

WO WO 98/45380 A1 10/1998
WO WO 2010/080967 A1 7/2010

OTHER PUBLICATIONS

Styrospray Component A MSDS, Industrial Polymers Inc., Dec. 2011, p. 1.*

(Continued)

*Primary Examiner* — Philip C Tucker
*Assistant Examiner* — Jimmy R Smith, Jr.
(74) *Attorney, Agent, or Firm* — Scully, Scott, Murphy & Presser, P.C.

(57) ABSTRACT

A biodegradable biomass article for use in construction includes a cellulose biomass. The cellulose biomass includes an alkaline crystalline substance. An adhesive layer covers an outer surface of the biomass, and a sealing layer covers the adhesive layer. A method for manufacturing the biodegradable biomass article includes drying a cellulose biomass, and mixing the biomass with water into a slurry. The slurry is heated, and strained after the step of heating, resulting in a residual paste. The residual paste is compressed to form a biomass mat. The biomass mat is heated, and an adhesive layer is applied which covers the biomass mat. A sealing layer is applied over the adhesive layer.

13 Claims, 5 Drawing Sheets

(51) Int. Cl.
*B32B 23/04* (2006.01)
*B32B 23/08* (2006.01)
*B32B 27/40* (2006.01)
*B32B 7/12* (2006.01)
*B32B 9/04* (2006.01)
*E04C 2/16* (2006.01)
*B32B 27/06* (2006.01)
*B32B 27/38* (2006.01)
*B32B 37/02* (2006.01)
*B32B 37/10* (2006.01)
*B32B 37/12* (2006.01)
*B32B 38/00* (2006.01)
*B32B 27/30* (2006.01)

(52) U.S. Cl.
CPC .............. *B32B 23/08* (2013.01); *B32B 27/06* (2013.01); *B32B 27/38* (2013.01); *B32B 27/40* (2013.01); *B32B 37/02* (2013.01); *B32B 37/06* (2013.01); *B32B 37/10* (2013.01); *B32B 37/1284* (2013.01); *B32B 38/0036* (2013.01); *E04C 2/16* (2013.01); *B32B 27/308* (2013.01); *B32B 2307/7163* (2013.01); *Y10T 428/3188* (2015.04); *Y10T 428/31515* (2015.04); *Y10T 428/31551* (2015.04); *Y10T 428/31554* (2015.04); *Y10T 428/31576* (2015.04); *Y10T 428/31591* (2015.04); *Y10T 428/31935* (2015.04); *Y10T 428/31971* (2015.04)

(58) Field of Classification Search
CPC ......... B32B 27/38; B32B 27/40; B32B 37/02; B32B 37/06; B32B 37/10; B32B 37/1284; B32B 37/15; B32B 38/0036; B32B 7/12; B32B 9/04; B32B 2375/00; E04C 2/16; E04C 2/24; Y10T 428/31515; Y10T 428/31551; Y10T 428/31554; Y10T 428/31576; Y10T 428/31591; Y10T 428/3188; B29C 67/0081; B29C 67/207
USPC ....................................................... 156/325
See application file for complete search history.

(56) References Cited

U.S. PATENT DOCUMENTS

| | | | |
|---|---|---|---|
| 4,201,835 A | 5/1980 | Jellinek et al. | |
| 4,597,928 A | 7/1986 | Terentiev et al. | |
| 4,902,445 A | 2/1990 | Bjorhaag et al. | |
| 5,277,762 A | 1/1994 | Felegi, Jr. et al. | |
| 5,314,582 A | 5/1994 | Nguyen et al. | |
| 5,418,031 A | 5/1995 | English | |
| 5,498,384 A | 3/1996 | Volk et al. | |
| 5,498,469 A | 3/1996 | Howard et al. | |
| 5,892,208 A | 4/1999 | Harris et al. | |
| 5,968,669 A * | 10/1999 | Liu .............. | C02F 1/72 428/313.5 |
| 6,136,408 A * | 10/2000 | Radcliffe ........... | B05D 7/08 264/29.4 |
| 6,221,997 B1 | 4/2001 | Woodhouse et al. | |
| 6,245,842 B1 * | 6/2001 | Buxton ............... | C08K 3/0058 252/609 |
| 6,362,302 B1 | 3/2002 | Boddie | |
| 6,843,844 B1 | 1/2005 | Van Horn | |
| 2002/0155279 A1 | 10/2002 | Dai et al. | |
| 2004/0096623 A1 | 5/2004 | Hashiba et al. | |
| 2005/0085608 A1 | 4/2005 | Oosterhoff | |
| 2006/0043629 A1 | 3/2006 | Drzal et al. | |
| 2007/0043198 A1 | 2/2007 | Madaj | |
| 2007/0149084 A1 | 6/2007 | Rouison et al. | |
| 2007/0199669 A1 | 8/2007 | Yang et al. | |
| 2008/0152945 A1 * | 6/2008 | Miller .............. | C04B 28/14 428/688 |
| 2008/0299317 A1 | 12/2008 | Hable | |
| 2009/0169812 A1 * | 7/2009 | Fan .................. | A61L 11/00 428/141 |
| 2011/0159295 A1 | 6/2011 | Marra et al. | |
| 2013/0202891 A1 * | 8/2013 | Thiede ............. | C08G 18/10 428/407 |

OTHER PUBLICATIONS

Styrospray Component B MSDS, Industrial Polymers Inc., Dec. 2011, p. 2.*
U.S. Office Action dated Jun. 9, 2014 issued in corresponding U.S. Appl. No. 13/042,023.
U.S. Final Office Action dated May 24, 2012 issued in corresponding U.S. Appl. No. 13/042,023.
U.S. Office Action dated Oct. 31, 2011 issued in corresponding U.S. Appl. No. 13/042,023.

* cited by examiner

BIOMASS ARTICLE AND METHOD OF MANUFACTURING

CROSS REFERENCE TO RELATED APPLICATIONS

The present application is a divisional application of co-pending application having U.S. Ser. No. 13/042,023, filed on Mar. 7, 2011, the contents of all of which are incorporated herein by reference.

BACKGROUND OF THE INVENTION

Field of the Invention

The present invention generally relates to a biodegradable biomass article and method for manufacturing the biomass article.

Description of Related Art

Currently, biomass materials such as byproducts, which may be biodegradable, require hauling to a place of disposal. Some advancement has been made in processing byproducts into value added products. Such processes include treating byproducts with chemicals and physical manipulation such as, grinding or chopping, and compressing or compacting the byproducts. The resulting products may be used for other purposes, for example, fertilizer or mulch, which may differ than the original use of the product from which the byproduct was extracted. However, such efforts for use of byproducts have fallen short of providing a biodegradable product comprised of byproducts and require relatively small amounts of energy to manufacture.

Further, for example, many current construction articles and materials of composition, such as plastics, for example, Polyvinyl chloride (PVC), which may be embodied as vinyl siding, are petroleum (oil) based. Such petroleum based materials require extraction of oil, processing of oil, and use of oil in the manufacturing process of the material, wherein the processing steps require expending energy and result in toxic byproducts. Further, when such oil based products are disposed of, they produce oil based waste products which do not readily decay, causing non-biodegradable products in landfills. Non-biodegradable products in landfills are harmful to the environment as they do not break down completely or degrade into a compost material, and remain in the landfill.

Therefore, there is a need for additional and improved value added products generated from biomass byproducts, for example, agricultural byproducts. One need for products generated from biomass material includes products used in building construction. There is further a need for a biomass biodegradable product that is non toxic and can provide attributes such as rigidity, thermal insulation, and sound proofing. Additionally there is a need for a biomass diodegradable product that is petroleum (oil) free, thus reducing oil dependence, the need to refine an oil based material, and dispose of oil based products.

SUMMARY OF THE INVENTION

In an aspect of the invention, a biodegradable biomass article for use in construction may include a cellulose biomass. The biomass may also include an alkaline crystalline substance. A adhesive layer covers an outer surface of the biomass, and a sealing layer covers the adhesive layer.

In another aspect of the invention, a method of manufacturing a biodegradable biomass article for use in construction comprises: drying a cellulose biomass; mixing the biomass with water into a slurry; heating the slurry; straining the slurry after the step of heating resulting in a residual paste; compressing the residual paste to form a cellulose biomass mat; heating the biomass mat; applying an adhesive layer covering the biomass mat; and applying a sealer layer on the biomass mat over the adhesive layer.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
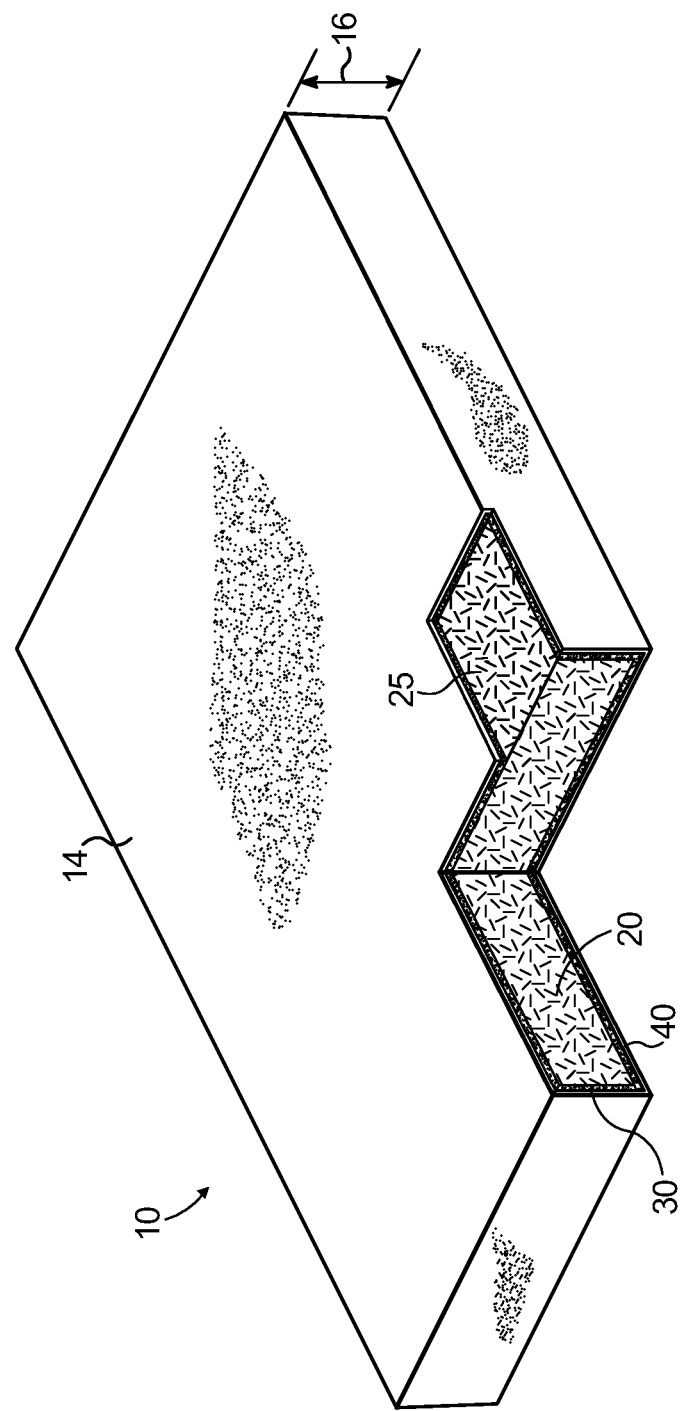
FIG. 1 is an isometric view with partial cutaway of an embodiment of a biomass article depicted as a rectangular biomass tile.

Referring to FIG. 1, a biomass article embodied as a biomass tile 10 includes a cellulose biomass mat 20. The biomass tile 10 is generally rectangularly shaped and includes a substantially planar top surface 14, as well as a bottom surface and sides, and has a specified thickness 16. The cellulose biomass mat 20 includes a cellulose biomass which may be comprised of grass, in whole or part, for example, switch grass or types of grass used in grass lawns. Thus, the cellulose biomass mat 20 according to this embodiment of the invention may also be referred to as a grass mat. Cellulose is the structural component of the primary cell wall of green plants. About one third of all plant matter is cellulose. As used herein, grasses include graminoids, which include the Poaceae (or Gramineae) family of grasses, as well as the sedge (Cyperaceae) and the rush (Juncaceae) families of grasses. The "true grasses" of the Poaceae family include cereals, bamboo, and the grasses of lawns (turf) and grassland.

The biomass mat 20 may further include, in one embodiment of the invention, an alkaline crystalline substance, for example, calcium oxide or calcium hydroxide (e.g., lime). The biomass tile 10 includes an adhesive layer 30 covering an outer surface 25 of the cellulose biomass mat 20. The adhesive layer 30 may include one or more of: an elastomeric acrylate resin, a urethane, or an aluminosilicate ($Al_2O_3.SiO_2$), and further may include a wood glue, an epoxy or a resin. A sealing layer 40 also covers the outer surface 25 of the cellulose biomass mat 20 over the adhesive layer 30. The thicknesses of the adhesive later 30 and the sealing layer 40 in relation to the cellulose biomass mat 20 are exaggerated for illustrative purposes in FIG. 1.

Figure 2:
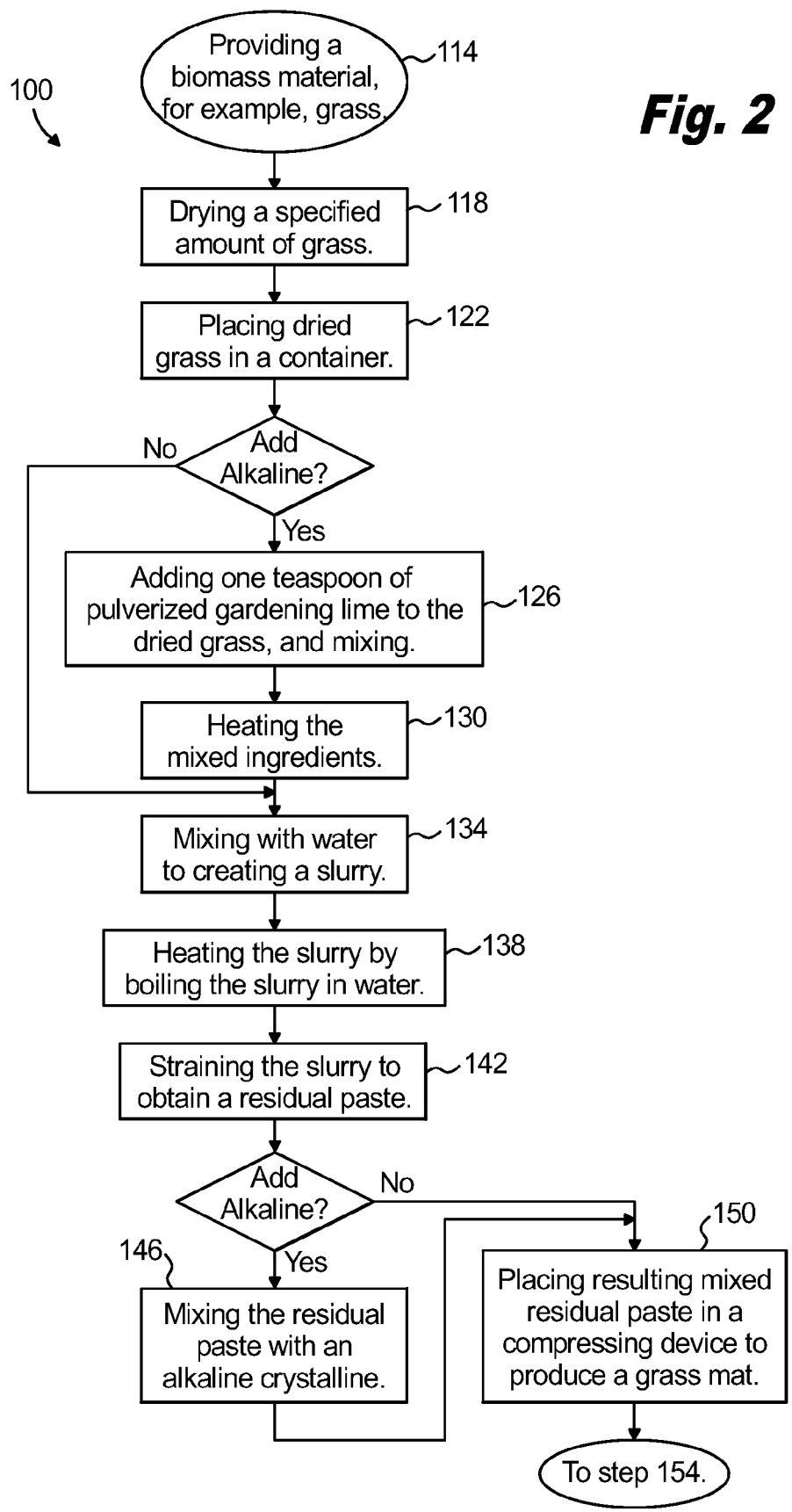
FIG. 2 is a flow chart depicting a method according to the present invention.
Figure 3:
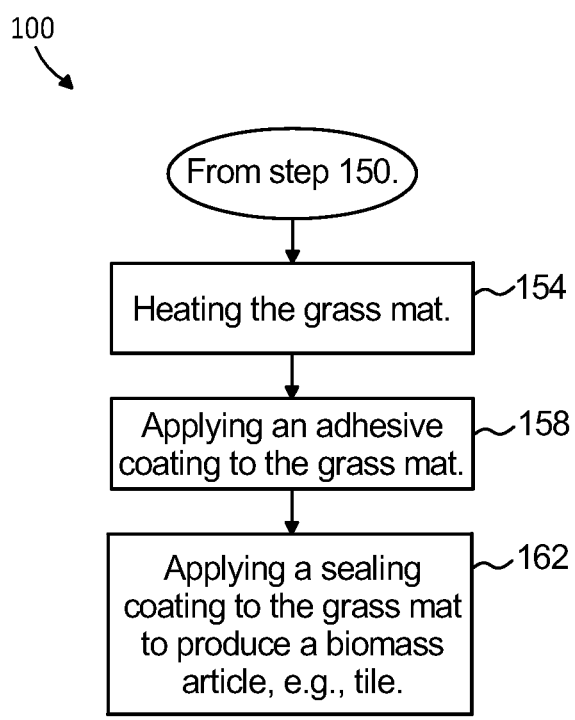
FIG. 3 is a flow chart which is a continuation of the flow chart of FIG. 2.
Figure 4:
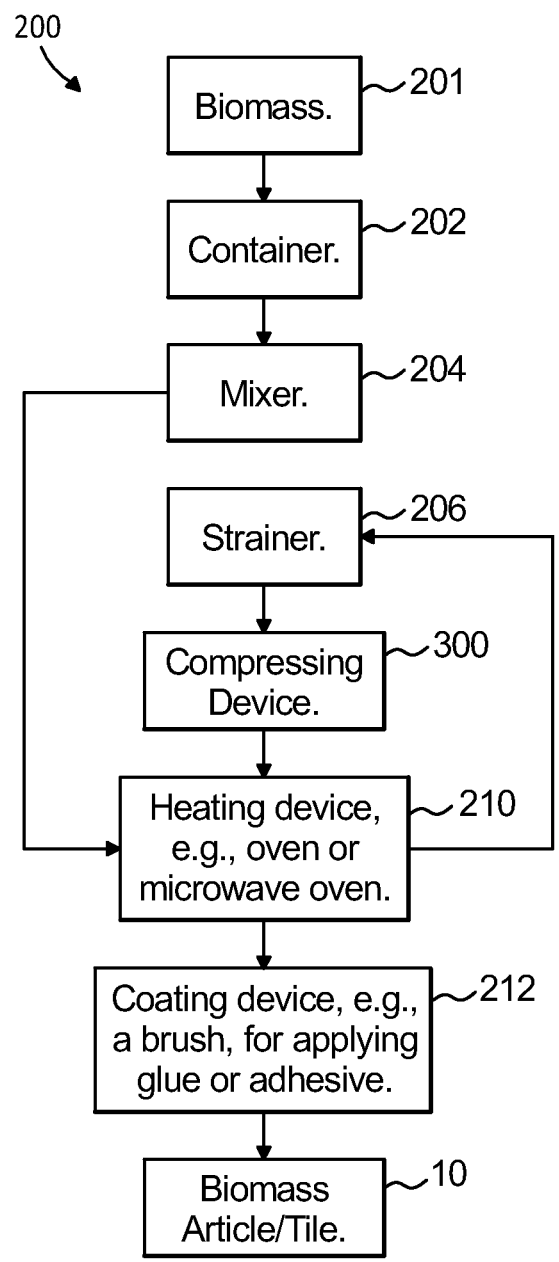
FIG. 4 is a schematic block diagram of the method of the invention depicted in FIGS. 2 and 3.

Referring to FIGS. 2-4, in one embodiment of the invention, a method 100 for manufacturing a biodegradable biomass article includes providing a cellulose biomass material 201 (FIG. 4) as in step 114 (FIG. 2). As discussed above, the cellulose biomass of the biomass mat 20 may include types of grasses. In the method 100, a specified amount of grass, such as one half pound is dried in step 118, for example, the specified amount of grass may be air-dried for about five days. Dried grass includes drying the grass so that it has lost it color and becomes like hay, and is used in the embodiment described herein. However, grass that is not wet, but not dried to the consistency of hay may also be used, with the weight of the amount of grass used adjusted, for example, one to two pounds of hay, since hay is lighter than other forms of dried grass, which corresponds to about one half pound of dried grass. In another example, the specified amount of grass (e.g., one half pound) may be dried by placing the grass in a ventilated oven at approximately 200° F. for about one hour, and then allowed to cool to room temperature.

Figure 5:
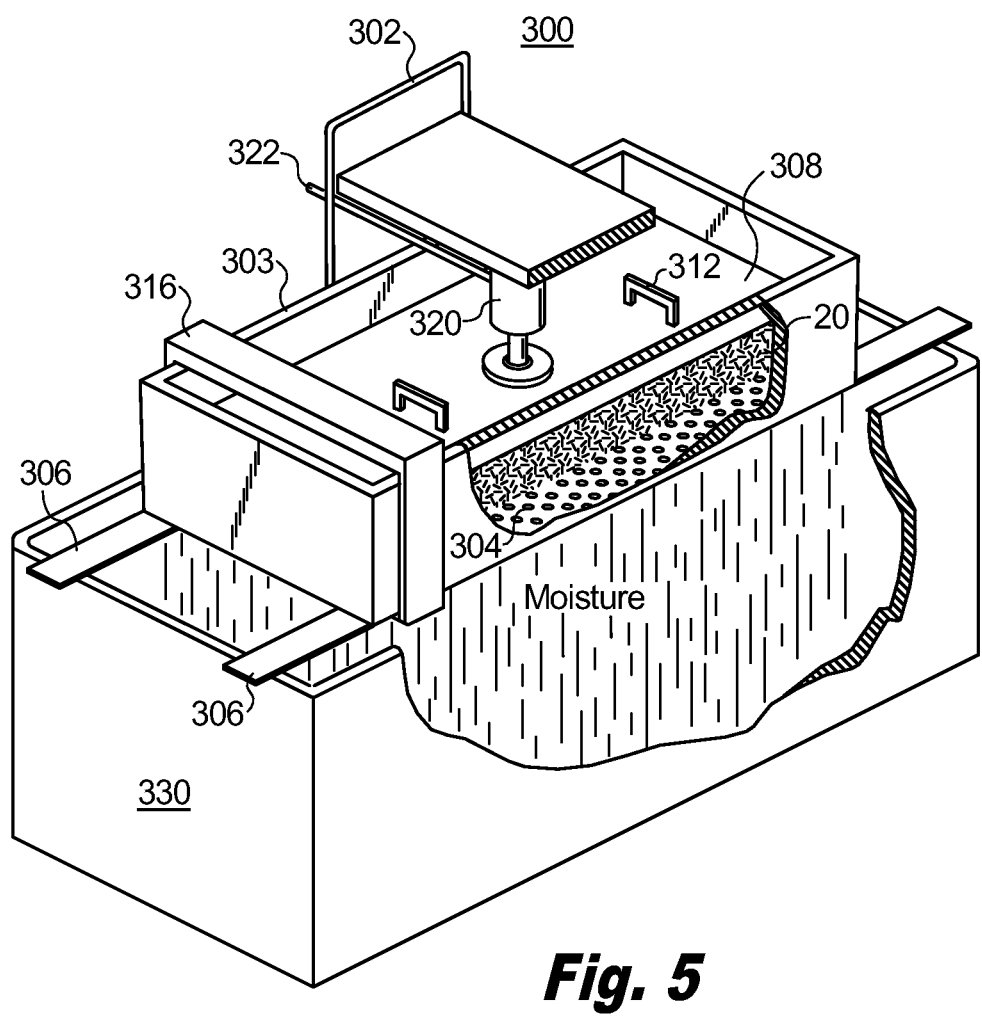
FIG. 5 is an isometric view of a pressing device according to an embodiment of the invention, compressing a biomass.

The dried grass is placed in a container 202 in step 122. In one alternative, when an Alkaline is not added to the dried grass, the dried grass is mixed with water and emulsified in step 134 using a mixer 204. For example, a blender may be used for blending the mixture with about thirty six ounces of water. The resulting heterogeneous solution is further blended, for example, using the blender, and further in a more specific example, using the blender on a high speed for about one and half minutes. Alternatively, blending may occur from about one to three minutes. The resulting slurry is heated by boiling it in water, for example, for about ten minutes after the boiling point has been achieved, as in step 138. Heating the slurry destroys unwanted living cells or bacteria in the slurry. After boiling, the slurry is strained using a strainer 206, for example by passing the slurry through a colander-like device, to obtain a residual paste, as in step 142. In another alternative, when a second dose of Alkaline is not added, the residual paste is compressed using a compressing device 300 (FIG. 4) in step 150, an embodiment of the compressing device 300 is shown in FIG. 5 and discussed in more detail below. The compressing device 300 is used to compress the residual paste of step 150 to remove liquid from the residual paste to produce the biomass mat or grass mat 20. Once the compression of the residual paste is completed, the resulting grass mat 20 is removed from the compressing device 300.

Referring to FIG. 3, the resulting grass mat 20 is dried by heating the mat in step 154, using a heating device 210, for example, a microwave oven or conventional oven, other examples may include a heat lamp. In one example, the grass mat 20 is placed on a piece of cardboard and heated at one minute intervals in the microwave, while flipping the grass mat over to its opposite side at each minute interval to ensure the grass mat dries evenly and thoroughly. The operation of heating and flipping may be performed an average of ten times (for example between 9-11 times). The heating step 154 dries the grass mat 20 for application of an adhesive layer. The microwave oven enhances the drying of the mat such that the mat has enhanced resiliency.

The method 100 continues to step 158 wherein an adhesive layer 30 is applied over all the outer surfaces of the grass mat 20, for example, wood glue may be coated over all areas of the grass mat using a coating device 212, such as a brush, or roller, or spray gun. For example, the adhesive layer may be from about one sixteenth of an inch to one quarter of an inch in thickness. Wood glue has a low amount of volatile organic compounds (VOCs) while providing water resistance, however, other glues may be used, for example, epoxies and resins. Also, adhesives having no VOCs may be used. Applying glue over the grass mat 20 has the benefit of: 1) hardening the grass mat into a tile or board like article; and 2) sealing the grass mat, or encapsulating the grass mat, thereby significantly reducing the odor of the grass. The adhesive layer may be allowed to dry for approximately 24 hrs. In an embodiment of the invention, the grass mat is approximately one quarter inch thick, and has dimensions of about 6 in by 8 in. Alternatively, the grass mat may be from one quarter of an inch thick to one inch, or from one inch to two or three inches or more in thickness.

Step 162 includes applying a sealing coat layer 40 on the grass mat 20 and over the adhesive layer 30, and allowed to dry. Step 162 of applying a sealer coat may be repeated. The drying, for example, may be accomplished over a 24 hour period. Similarly to the adhesive layer, the sealing coat layer may be, for example, from about one sixteenth of an inch to one quarter of an inch in thickness. The resulting biomass article is biodegradable, and may be any shape such as a square article, or a rectangular shaped article (as shown in FIG. 1), or triangular, or circular. The biomass article may be embodied as a biodegradable tile 10, for example, for use on a roof, or a ceiling tile, thermal insulation for walls, boards to replace drywall or gypsum board, a soundproofing board, or tiles for flooring when Styrospray® is used as a sealing coat in step 162, or as siding on a building, or for other construction purposes. Styrospray® is an embodiment of a urethane polymer and hydroxy terminated polyoxyalkylene (polyol) mixture; generally as polyether, which is mixed together before use. The biomass article may have various thicknesses, such as between one sixteenth of an inch to three inches or more.

In particular, referring to the adhesive used in step 158 for coating the grass mat, the adhesive may be an elastomeric acrylate resin. For example, a product including the elastomeric acrylate resin as a copolymer of n-butyl acrylate and methyl methacrylate may be found in Rhino Shield™, wherein the elements may be produced by BASF®. The elastomeric acrylate resin is combined with urethane, such as manufactured by Bayer® and aluminosilicate ($Al_2O_3.SiO_2$), for example, the aluminosilicate may be produced by 3M™ as ceramic microspheres with alkaline oxides: silica, alumina and sodium, calcium, potassium and magnesium oxides. The purpose of adding the urethane is for tensile strength and enhanced resistance against moisture. The microspheres are high strength ceramic off-white spheres with low density and low cost utility: sandability, machinability, thermal insulation, temperature resistance (2200 degrees F.), weight reduction, and water resistance. Other embodiments of the invention may include not combining the urethane with the elastomeric acrylate resin.

Referring to FIG. 5, an embodiment of a compressing device 300 includes lift brackets 302 (only one is shown in FIG. 5 for illustrative purposes) attached to a body 303, and a bottom screen 304 as a perforated base plate fitting inside the body 303. The device 300, for example, may measure approximately 6"×8" including the screen 304, and include a solid top plate 308 having handles 312. The extensions 306 enable the device 300 to straddle a container 330. The grass paste of step 142 may be placed in the body of the device 300 over the screen 304. The plate 308 is then placed over the grass. After the plate 308 is positioned over the grass paste, a locking device 316 which is rectangular and defines a central opening, is slid over the plate 308, the body 303, and the screen 304, to lock the plate 308, body 303, and screen 304 together. A pressure device may be placed on the top plate 308 for compressing a grass paste between the solid top plate 308 and the bottom screen 304, for example, a hydraulic jack 320, as shown in FIG. 5. The jack 320 is positioned between the top plate 308 and the lift brackets 302. The jack 320 can be pumped and extended using the handle 322, until the liquid is squeezed from the paste to produce the grass mat 20 of step 150, for example, the pressure may be maintained for a period of time at maximum pressure, and then released. For example, a six ton capacity hydraulic jack can be exerted at maximum pressure for approximately one minute, and then released. This compression can also be repeated until the desired result is achieved of a grass mat according to the disclosure.

In another embodiment of the invention, the method 100 may include additional steps as discussed below. Additional steps include, after step 122, adding an alkaline material, such as lime, in step 126. Step 126 includes mixing an alkaline crystalline, calcium oxide or calcium hydroxide or lime into the mixture, for example, adding one teaspoon of pulverized gardening lime to the dried grass, and mixing the ingredients for a specified amount of time. The mixed ingredients of grass and lime are heated in step 130, for example, the grass and lime may be placed in a microwave oven for two, twenty second intervals. The addition of lime discourages bacterial growth, and heating the lime mixture further enhances the elimination of bacteria. Further, carbonates and bicarbonates can also be used in addition to lime for hindering bacterial growth, for example, potassium bicarbonate, sodium bicarbonate (e.g., baking soda), potassium carbonate, sodium carbonate, and calcium carbonates, etc. The method 100 as described above is continued, that is, mixing the grass-lime mixture in step 134, heating by boiling in water in step 138, and straining the slurry in step 142. However, additional step 146 is applied when the option of adding an alkaline material, such as lime, is taken in step 126. The remaining residual paste from the previous step 142 is mixed after combining an alkaline crystalline such as calcium oxide or calcium hydroxide, in step 146. The mixing may include, for example, mixing the residual paste with six teaspoons of lime. The resulting mixed residual paste is placed in the compressing device 300, in step 150, and the method continues to produce the biomass article as in the embodiment above.

In another embodiment of the invention, screens may be permanently placed between grass mats. The screens add strength to the final article, especially in larger piece articles or for hanging articles such as drop ceiling tiles to avoid warping or sagging. For example, three screens are used as follows: 1) a first screen is positioned between two grass mats. The two grass mats include an adhesive and sealer coat as described above. Two outer screens are added over the grass mats such that the first screen is between the two grass mats, and the grass mats are between the two outer screens. The outer screens are sprayed with a non stick substance so that when compressed, for instance covering with cardboard and compressing, the removal of the cover is facilitated by not sticking to the outer screens.

In another embodiment of the invention, multiple screens, for example, four screens, may be positioned between grass mats, and compressed. The additional screens add strength as discussed above. One application for this type of board is for thermal insulation, or for any article use where additional strength is needed for sturdiness.

In another embodiment of the invention, two grass mats produced as in the first embodiment above are coated with a wood glue layer, for example, Elemer's Glue™ or TITE BOND III™. Further, a sealing coating layer may be applied over the glue layer. The sealing coat layer may be a mixture, for example, Styrospray®, which can be brushed onto a dried glue layer on opposite faces of the grass mat. The mixture can be applied by roller, brush or spray onto the mat, or the mixture can be added to the grass and stirred to make the slurry (at step 134). Thereafter, screens are applied to the outer surfaces and sprayed with a lubricant. Then, two pieces of cardboard are put over the screens and the entire unit is compressed, for example, between two steel plates similar to the previously described compressing device 300, and the screens removed. The resulting biomass board is flexible and water resistant. Optionally, the two screens can also be left in place and a second coat of Styrospray® can be applied to them. When dry, the material is exceptionally hard. The wood glue layer, applied before applying a sealing coat such as Styrospray®, discourages warping of the mat and resulting biomass article.

In another alternative, a cellulose biomass can be mixed with an amount of Styrospray® to form a slurry, and then poured into a lubricated form, and left to dry, resulting in a hard tile. For example, four cups of grass may be mixed with Styrospray®. The resulting slurry is poured into a lubricated form and left to dry. Once dry, the result is a hard tile. As discussed above, Styrospray® is an embodiment of a urethane polymer and hydroxy terminated polyoxyalkylene (polyol) mixture; generally as polyether, which is mixed together before use, and then, in the embodiment of the invention above, mixed with the slurry.

Thereby, the present disclosure includes a biodegradable biomass article, and method of manufacture of the same, which eliminates the shortcomings, such as byproducts of an oil base product (as discussed above in the "Background of the Invention"). The present disclosure provides a biodegradable product which reduces landfill capacity, includes the use of a renewable resource, i.e., cellulose biomass material, for example, grasses, and reduces the reliance on oil based products. The reduction of oil based products reduces the need for oil exploration, oil extraction, petroleum processing, including processing byproducts which find their way into the air and water, soil, and ultimately the food chain. Moreover, the biodegradable nature of the biomass article of the present invention allows decomposition of the biomass article and the materials of the article including the grass component, such that the decomposed biomass article becomes compost-like, which is the natural byproduct of cellulose based organic products. In one example, the decomposed compost derived from the biodegradable biomass article of the present disclosure can be recycled and used in gardening as mulch. Further, the biodegradable biomass article of the present disclosure provides thermal insulating properties, for example, which may be used as a siding in homes to reduce energy consumption for heating and cooling homes, thus conserving energy.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method of manufacturing a biodegradable biomass article for use in construction, the method consisting of the steps of:

mixing a cellulose biomass with water into a slurry;
heating the slurry;
mixing the slurry with a mixture comprising a urethane polymer and a hydroxyl terminated polyoxyalkylene;

straining the slurry after the step of heating resulting in a residual paste;
compressing the residual paste to form a biomass mat;
heating the biomass mat; and
applying an adhesive layer covering the biomass mat.

2. The method of claim 1, wherein the cellulose biomass comprises a type of grass in the Poaceae family of grasses.

3. The method of claim 1, wherein the slurry heating step comprises heating the slurry in boiling water.

4. The method of claim 1, wherein the adhesive layer comprises wood glue, epoxies, resins or a mixture of urethane polymer and a hydroxyl terminated polyoxyalkylene.

5. The method of claim 1, wherein the adhesive layer comprises an elastomeric acrylate resin.

6. The method of claim 5, wherein the elastomeric acrylate resin further comprises a urethane and an aluminosilicate.

7. A method of manufacturing a biodegradable biomass article for use in construction, the method consisting of the steps of:
mixing a celluose biomass with water into a slurry;
heating the slurry;
mixing the slurry with a mixture comprising a urethane polymer and a hydroxyl terminated polyoxyalkylene;
straining the slurry after the step of heating resulting in a residual paste;
mixing the residual paste with an alkaline crystalline substance selected from the group consisting of calcium oxide, calcium hydroxide, and lime;
compressing the residual paste to form a biomass mat;
heating the biomass mat; and
applying an adhesive layer covering the biomass mat.

8. A system for manufacturing a biodegradable biomass article for use in construction, the system consisting of the steps of:
mixing a biomass with water into a slurry using a mixer;
heating the slurry using a heating device;
mixing the slurry with a mixture comprising a urethane polymer and a hydroxyl terminated polyoxyalkylene;
straining the slurry after the step of heating using a strainer resulting in a residual paste;
compressing the residual paste to form a biomass mat using a compressing device;
heating the biomass mat; and
applying an adhesive layer covering the biomass mat using a coating device.

9. The system of claim 8, wherein the cellulose biomass comprises a type of grass in the Poaceae family of grasses.

10. The system of claim 8, wherein the slurry heating step comprises heating the slurry in boiling water.

11. The system of claim 8, wherein the adhesive layer comprises wood glue, epoxies, resins or a mixture of urethane polymer and a hydroxyl terminated polyoxyalkylene.

12. The system of claim 8, wherein the adhesive layer comprises an elastomeric acrylate resin.

13. The system of claim 12, wherein the elastomeric acrylate resin further comprises a urethane and an aluminosilicate.

* * * * *